United States Patent
Cha

(10) Patent No.: US 7,716,119 B2
(45) Date of Patent: *May 11, 2010

(54) COMPUTER SOFTWARE AND SYSTEM FOR AUTOMATIC STOCK DEALINGS

(76) Inventor: Min-Ho Cha, 109-204 Daeah Apt., Kayang-Dong, Kangseo-Gu, Seoul (KR)

( * ) Notice: Subject to any disclaimer, the term of this patent is extended or adjusted under 35 U.S.C. 154(b) by 517 days.

This patent is subject to a terminal disclaimer.

(21) Appl. No.: 11/647,647

(22) Filed: Dec. 28, 2006

(65) Prior Publication Data

US 2007/0136165 A1 Jun. 14, 2007

Related U.S. Application Data

(63) Continuation of application No. 09/509,326, filed on Mar. 24, 2000, now Pat. No. 7,181,425.

(30) Foreign Application Priority Data

Sep. 3, 1999 (KR) .................................. 99-37343

(51) Int. Cl.
*G06Q 40/00* (2006.01)
(52) U.S. Cl. ............................... 705/37; 705/4; 705/35; 705/38; 705/39
(58) Field of Classification Search .................. None
See application file for complete search history.

(56) References Cited

U.S. PATENT DOCUMENTS 4,412,287 A  10/1983  Braddock, III (Continued)

FOREIGN PATENT DOCUMENTS

| DE | 19956626 | 10/2000 |
| EP | 0 401 203 A2 | 12/1990 |
| JP | 1115878 | 5/1989 |
| WO | 96/34357 | 10/1996 |

OTHER PUBLICATIONS

Ameritrade Web Page, Feb. 11, 1998, "Client Trade Here". http://web1.archive.org/web/19980211222921/http://www.ameritrade.com.
E*Trade Web Page, Apr. 8, 1997, "Welcome to the Smarter way to Invest". http://web1.archive.org/web/19970409110234/http://www.etrade.com.

(Continued)

*Primary Examiner*—Alexander Kalinowski
*Assistant Examiner*—Muriel Tinkler

(57) ABSTRACT

A computer readable medium is configured with instructions for causing a first computer system connected to a computer system of stock exchange market via a data communication network to automatically place a series of stock trade orders. The first computer system can include, for instance, a user computer, a brokerage computer, or both. An automated system for systematically and repeatedly placing stock trade orders based on predetermined conditions is also provided. In general, the automated system or computer system running the software operates by receiving and storing an automatic stock trading condition. A stock trading order can be placed immediately following a previously contracted order, or when a stock market status satisfies the preset stock trading condition. The first computer system preferably receives user input including basic information such as an item code of the stock and an account number of a stockholder. Automatic trade condition information can also be input into the first computer system by the user or a broker and preferably provides information for determining a desired selling price and quantity and/or a desired purchasing price and quantity for trading of the stock. Market data, preferably including the stock price is received into the first computer system via the data communication network, such as from the stock exchange market computer system. The first computer system can then determine whether a stock purchase or sale condition generated using the automatic trade condition information has been met and place a stock purchase or sale order via the data communication network when the stock purchase or sale condition is met. This system can systematically repeat the process using the automatic trade condition information as a guide for trading. The process can be repeated continuously or can be stopped when a predetermined condition is satisfied.

7 Claims, 7 Drawing Sheets

U.S. PATENT DOCUMENTS

| | | | | |
|---|---|---|---|---|
| 4,674,044 | A | * | 6/1987 | Kalmus et al. ............... 705/37 |
| 5,297,031 | A | * | 3/1994 | Gutterman et al. ........... 705/37 |
| 5,787,402 | A | | 7/1998 | Potter et al. |
| 5,797,127 | A | | 8/1998 | Walker et al. |
| 6,014,643 | A | * | 1/2000 | Minton .................... 705/36 R |
| 6,029,146 | A | | 2/2000 | Hawkins et al. |

OTHER PUBLICATIONS

E*Trade Web Page, Feb. 16, 1998, "Master the Market". http://web1.archive.org/web/1998021608185/http://www.etrade.com.

* cited by examiner

FIG.6

| ITEM CODE | 12260 | DEF COMPANY ▽ | CLOSING PRICE |
| INPUT AMOUNT | 10,000,000 WON | POSSESSED STOCKS | 10,000 SHARES |

○ INITIAL TRADE CONDITION

CURRENT PRICE

INITIAL TRADE | SELLING ▽ | 10,000 WON | 100 SHARES

○ AUTOMATIC TRADE CONDITION

REFERENCE QUANTITY 100 SHARES (602)   FEE 0.25 % (604) (610)

PURCHASE CONDITION | UNIT PRICE | FIXED AMOUNT(WON) ▽ (606/608) | 500 WON | QUANTITY | FIXED RATE (%) ▽ (614) | (612)

SELLING CONDITION | UNIT PRICE | FIXED AMOUNT(WON) ▽ | 1.000 WON | QUANTITY | FIXED RATE (%) ▽ | (620)

EXTRA TRADE CONDITION | FIXED RATE (%) ▽ (622) | WON (624) (616) | TARGET PROFIT RATE (618) | 20 % (626)

TRADE TABLE (APPLICATION) (628)

FIG.7

AUTOMATIC TRADE TABLE

| PURCHASE | | SELLING | |
|---|---|---|---|
| ORDER QUANTITY | PURCHASE PRICE | ORDER QUANTITY | SELLING PRICE |
| 100 | 13,500 | 100 | 14,000 |
| 100 | 12,500 | 100 | 13,000 |
| 100 | 11,500 | 100 | 12,000 |
| 100 | 10,500 | 100 | 11,000 |
| 100 | 9,500 | 100 | 10,000 |
| 100 | 8,500 | 100 | 9,000 |
| 100 | 7,500 | 100 | 8,000 |
| 100 | 6,500 | 100 | 7,000 |
| 100 | 5,500 | 100 | 6,000 |
| 100 | 4,500 | 100 | 5,000 |
| 100 | 3,500 | 100 | 4,000 |
| 100 | 2,500 | 100 | 3,000 |
| 100 | 1,500 | 100 | 2,000 |
| 100 | 100 | 100 | 1,000 |

TRADE TABLE CONFIRMATION

COMPUTER SOFTWARE AND SYSTEM FOR AUTOMATIC STOCK DEALINGS

PRIORITY INFORMATION

This application is a continuation application from U.S. patent application Ser. No. 09/509,326, filed Mar. 24, 2000 now U.S. Pat. No. 7,181,425, which is related to PCT Application Serial No. PCT/KR00/00125, filed Feb. 16, 2000, which claims priority from South Korean Patent Application Serial Nos. 99-37343 and 99-6108, filed Sep. 3, 1999 and Feb. 24, 1999, respectively, the contents of each of which are hereby incorporated by reference in their entirety.

FIELD OF THE INVENTION

The present invention relates to a computerized or computer-implemented system for performing a systematic method of stock dealing. More particularly, this invention relates to a computerized system and method for automatically transacting multiple trade orders.

BACKGROUND OF THE INVENTION

Computer-implemented methods and systems for trading articles such as stocks, foreign exchanges, cereals, ores, futures, and the like are well-known in the industry. In a conventional method and system, an investor inputs into a computer desired purchase (or selling) price and desired purchase (or selling) quantity of certain articles, securities, foreign exchanges or indexes to generate a trade order and to conclude a trade.

It has been a general practice for a stockholder to directly order a stock transaction at a brokerage company or to commission an employee at a brokerage company to order such a stock transaction under the employee's own discretion. Conventionally, when a stockholder intends to order a sale or purchase of a stock, he or she contacts a brokerage company either in person, by telephone, by personal computer through a communication network system, or via the Internet. When a staff member at the brokerage company is commissioned to make the transactions, stock trading is performed based on the trader's relationship with the broker and the trader must rely on the broker's decisions.

A method for dealing in stocks at a stock exchange market ("SEM") as well as some of the terminologies used in relation to stock dealing will now be described briefly using the New York Stock Exchange ("NYSE") and the Korean Stock Exchange ("KSE") as examples. The "closing price" is the trading price of a particular share at the close of trading at the stock market. The "opening price" is price of the particular share at the beginning of trading, which is also the same as the previous trading day's closing price. The term "high price" refers to the highest price at which a particular stock traded during the day, while "low price" refers to the lowest transacted price of the day. Share trading at the NYSE is permitted from 9:30 am to 4:00 pm Eastern Standard Time ("EST"). After-hour orders for stock dealing can also be placed from 4:00 pm, after market closing, until 9:30 am EST the following day. Trading orders may be placed in any of the previously-described manners.

In the KSE, as of February 1999, a stock price is based on a closing price of a previous day and can rise or fall within a range of 15% of the previous day's closing price. The KSE opens at 9 am during workdays except for holidays, weekend and yearend, and closes at 3 pm. A "daily upper limit" in the stock dealing means a price 15% above the closing price of the previous day, and a "daily lower limit" means a price 15% below the closing price of the previous day. Purchases and sales of stock can be made from 9 am, when the stock market opens, until 3 pm, when it closes, but orders for stock dealing can be reserved even after the market is closed from 5 pm until 9 am the following day when communication by computer, ARS, Internet, or the like are utilized.

FIG. 1 is a schematic diagram illustrating a conventional system for facilitating the buying and selling of stocks. Referring to FIG. 1, a conventional method of buying and selling stocks proceeds with a user placing a trade order utilizing the communication between a computer and the stock market, such as over the Internet. More particularly, a stockholder's (user's) computer system 10 is connected to a computer system 20 of a brokerage company via a data communications network 40 (such as the Internet). The stockholder deals with the brokerage company to confirm trade information such as an account balance, residual quantity of stocks, present price, or closing price of his desired stock. When the stockholder orders the sale or purchase of a particular stock, the transaction is entered into the computer system 20 of the brokerage company. The transaction is then transferred to a computer system 30 of the SEM after being processed by the brokerage company. When the trade order is received at the SEM computer system 30 via the network 40 from the brokerage company, the SEM computer system 30 matches a selling order price and quantity with a buying order price and quantity and allows the trade to be concluded at that particular price.

Generally, this kind of buying and selling is repeated on a minute-by-minute, transaction-by transaction basis during the open trading period of the market. A similar method is performed when the stockholder visits the brokerage company, except that the stockholder's personal computer system 10 need not be used to input the trade order information. In order to transact these orders, whether they are purchase or sale orders, certain information is required. For instance, an item code of the stock to be bought or sold, the desired purchasing or selling price, the desired purchasing or selling quantity, and similar information should be input by the stockholder or authorized broker at the brokerage company via a computer or ARS.

Stock investors may frequently consider future transaction conditions under which they intend to invest, including desired purchase price and purchase quantity, and desired selling price and selling quantity of a particular stock. Unfortunately, however, in order to determine whether the current price of the stock has reached a desired purchase or selling price, they must be constantly aware of stock price changes at the stock market. Therefore, in order to be successful in stock investment under the conventional stock dealing method described above, continuously changing market conditions must be carefully monitored and acted upon quickly.

Conventionally, however, it has been difficult to constantly observe the changing stock prices. In addition, fundamental basic information data (e.g., stock account number, account password, etc.) and buying/selling condition information data (e.g., stock item code, desired buying/selling prices, desired buying/selling quantity, etc.) generally needs to be input via the computer system 20 at the broker's office by the stockholder or broker at every dealing point in time. Accordingly, in order to place a trading order corresponding to a desired purchase or sale condition, market information needed to be continuously monitored by the broker or trader, and the trading order needed to then be timely placed when the market information matched the desired purchase or sale condition.

Accordingly, a significant disadvantage of conventional trading methods is that much of the stockholder's and/or broker's time is consumed watching the market information and initiating trading orders. In addition, investors who are unable to timely contact their brokers and/or fully communicate their trading preferences to the brokerage find it difficult to properly supervise and direct their portfolios.

Another significant problem is that the brokerage company staff must expend inordinate amounts of time placing each and every buy and/or sell order. Furthermore, if there is an input error when entering necessary information data—such as may be due to erroneous typing or other mistake—the brokerage company faces potential liability for the amount of the investor's economic loss.

SUMMARY OF THE INVENTION

Various principles and aspects of the present invention provide solutions to each of the aforementioned problems. In one embodiment, the present invention provides an automated ordering system for repeatedly dealing in a desired stock based on the price fluctuations of that stock. This automated ordering system can include software for causing a user's computer (or other computer) to initiate and transact deals in a desired stock where one or more conditions for ordering a sale or purchase of the desired stock are input into the user's computer and where multiple subsequent sales and/or purchases of the desired stock are automatically transacted when the predetermined conditions are met.

One embodiment of the present invention provides software for a computer system that enables automated stock dealing by enabling a user to preset a number of stock purchase and/or sale conditions and by facilitating the automatic placement and execution of multiple systematic stock purchase and/or sale orders when market conditions meet the preset conditions.

Another embodiment of the present invention provides an automatic ordering system for stock dealing in which subsequent stock purchase and/or sale orders are automatically placed when a previous purchase/sale order is contracted, regardless of the current market conditions.

In accordance with principles of the present invention, software for conducting an automatic ordering method for stock dealing is provided. The software preferably enables a user's computer system connected to a stock exchange market computer system via a data communication network to systematically and repeatedly place stock purchase and/or sale orders. More particularly, the software preferably causes the computer system to receive user input of basic information data such as an item code of the desired stock and an account number of a stockholder. A user can then input one or more automatic trade conditions, used to generate a plurality of stock purchase and/or sale conditions, such as a desired selling price and quantity or a desired purchase price and quantity.

Market information data, including, for example, the stock price, the trading volume and the business information of the listed company can also be received by the computer system running the software (which can be the user's computer, a brokerage computer, or both). The computer system then uses the received market information data to determine whether a stock purchase and/or sale condition has been met. When the user's computer system determines that the stock purchase and/or sale condition has been met, the computer system can then place the stock purchase and/or sale order based on the met condition via the data communication network.

In other embodiments, however, the computer system can immediately place subsequent automatic trade orders as soon as a previous order is contracted, regardless of whether those conditions are satisfied by the present market conditions. Limits can be placed on the number of automatic trades and conditions can be set for determining when to conclude the automatic trading.

BRIEF DESCRIPTION OF THE DRAWINGS

A more complete understanding of the nature and objects of the present invention can be gained from the following detailed description taken in conjunction with the accompanying drawings, in which:

FIG. 6 is a schematic diagram illustrating a user interface providing user-selectable inputs for generating an automatic stock trading table for performing an automatic stock ordering method using a computer system according to still further principles of the present invention; and FIG. 7 is a schematic diagram illustrating an automatic trade table according to yet another aspect of the present invention.

DETAILED DESCRIPTION

Figure 1:
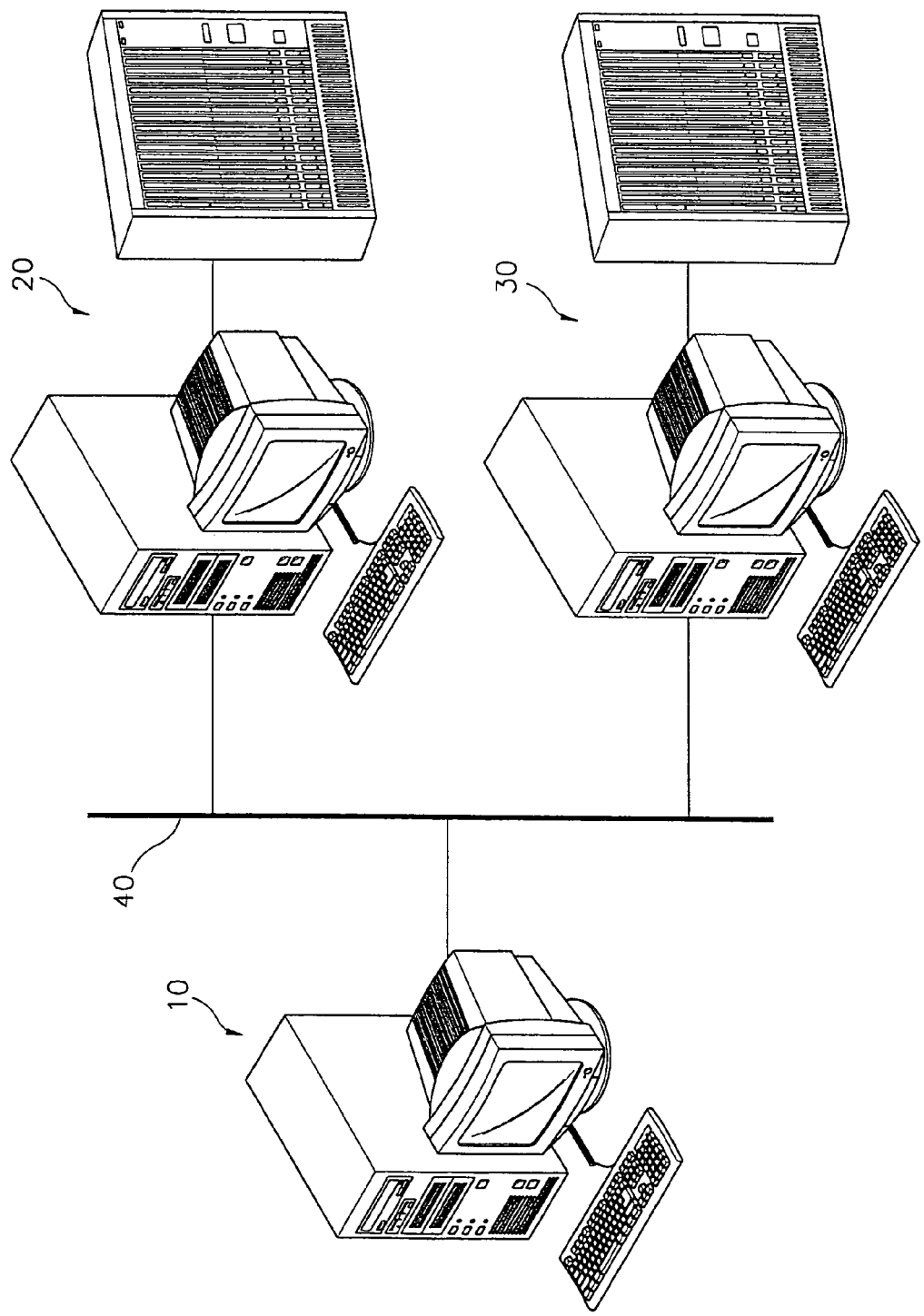
FIG. 1 is a schematic diagram illustrating a computer system for stock dealing via a network.
Figure 2:
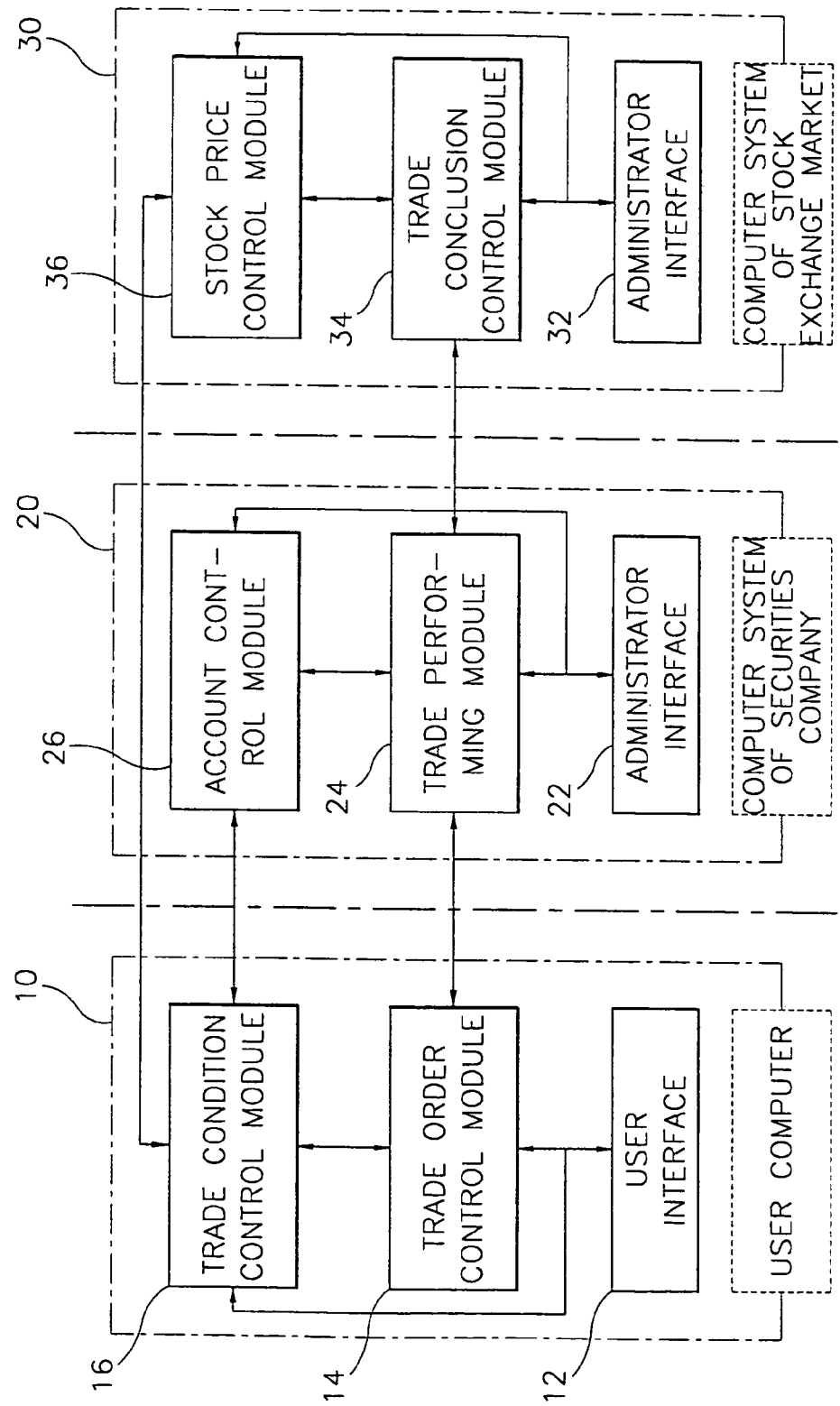
FIG. 2 is a schematic block diagram illustrating an automatic stock ordering system according to one embodiment of the present invention.

Certain preferred embodiments of the present invention will now be described in greater detail with reference to the accompanying drawings. More particularly, FIG. 1 is a schematic diagram of a networked computer system having a user computer 10, a brokerage computer 20, and an SEM computer 30 capable of running software to enable automatic stock dealing. FIG. 2 is a schematic block diagram illustrating an automatic stock ordering system that can be implemented using hardware and software arranged on the user computer 10, the brokerage computer 20, and the SEM computer 30, according to one embodiment of the present invention.

Referring to FIGS. 1 and 2, an automatic ordering system of stock dealing according to principles of the present invention can, similar to the conventional system, include a user's computer system 10, a brokerage company computer system 20, and a SEM computer system 30 mutually connected for performing data communication with each other via a network 40. The user computer 10 can include software for use in performing the automatic ordering process according to principles of the present invention, and preferably includes a user interface 12, a deal order control module 14, and a trading condition control module 16. The user interface 12 provides an interface between the user (e.g., a stockholder) and the user computer 10. The deal order control module 14 preferably compares one or more stock dealing conditions established by a stockholder with market information to allow placing a trading order of the desired stock at the appropriate time. The market information can include, for example, price information such as an opening price of the desired stock, trade volume (relevant in the controlled KSE), current price, or other information. The trading condition control module 16 preferably generates one or more new stock trading conditions based on changes input by the user or based on preset automatic trading conditions as a result of concluded trades.

Of course, the user's computer 10 can include various other applications and hardware to facilitate the automatic ordering process. The user's computer 10 can, for instance, include software such as an operating system for operating the computer system, and various other applications and hardware, such as a central processing unit, memory, and hard disks. The user's computer 10 can also include hardware such as a modem or LAN adapter (not shown) for data communication with the computer system 20 at a brokerage company or with the SEM computer system 30, and can also include related software such as a data communication control application. These can be provided as part of a communication control module (not shown).

The brokerage company computer system 20 can be connected to the user's computer 10 via the network 40 for data communication. The brokerage computer system 20 preferably includes an administrator's interface 22, a trade performing module 24, and an account control module 26. The administrator's interface provides an interface between the computer system 20 and a brokerage company administrator. The trade performing module 24 receives orders from the user's computer 10 and transmits those orders to the SEM computer system 30 to allow a stock trade to be concluded. The account control module 26 stores a useable balance and residual stock quantity of a stockholder's account and updates this information based on contracted trades.

It should also be noted that the computer system 20 at the brokerage company can include additional hardware and software for operating as a computer system generally. For instance, additional hardware and software similar to that described previously with respect to the user's computer 10 can be provided in the brokerage company's computer 20.

The SEM computer system 30 is also preferably provided with an administrator interface 32 to permit interfacing between an SEM administrator and the SEM computer system 30. A deal (trade) order conclusion control module 34 is provided in the SEM computer system 30 to facilitate receiving and matching purchase orders and selling orders from multiple brokerage company computer systems 20 to conclude the requested trades. A stock price control module 36 updates the stock price based on the concluded stock trade quantity and price information. The SEM computer system 30 can also include additional software and hardware for performing its other functions, similar to those of the user computer 10 or the computer system 20 at the brokerage (securities) company.

The various modules (as illustrated in FIG. 2) preferably perform mutual data communication including communication with other modules within each computer system 10, 20, 30 and communication between modules of the different computer systems via the data communication control module. The data flow paths and module relationships for providing the data communication are schematically illustrated in FIG. 2 by two-way arrows. Although FIG. 2 illustrates a direct connection between the user computer 10 and the SEM computer 30, such a direct connection is not essential, and the user computer 10 may be connected only to the brokerage company computer system 20. The various pieces of hardware and software for providing data communication between the modules and computer systems are well known to those of ordinary skill in the art to which the present invention belongs, and a detailed description thereof will therefore be omitted.

In addition, those of ordinary skill in the art will be able to readily arrange, rearrange, or modify the computer system resources and/or modules between the user computer 10, the computer system 20 of a securities (brokerage) company, and the computer system 30 of the SEM. Accordingly, it should be noted that while FIG. 2 illustrates one embodiment of a system for implementing the principles of the present invention, the particular system configuration may be modified by a person skilled in the art in various arrangements and configurations without departing from those principles.

For instance, it should be noted that all or part of the trade order control module 14 and the trade condition control module 16 of the user computer 10 may be integrated into the computer system 20 of the securities company. In addition, the system may be configured such that a user is simply connected to a computer 20 of a securities company through the user interface 12. The user interface 12 can also be provided as part of the brokerage computer 20 rather than a separate user computer 10. Furthermore, in a country where it is legally allowed for a user to directly connect to a computer system 30 of a stock market in placing a stock trade order, the modules found on the computer system 20 of a securities company may be integrated directly into the user computer 10. Where a securities company invests in a stock on behalf of a client, the necessary hardware and software resources of the user computer 10 can be integrated into the computer system 20 of the securities company. In other words, any of the modules or interfaces of the various computer systems could be implemented in any of the other computer systems and still satisfy the principles of the present invention. Furthermore, one or more of the computer systems 10, 20, 30 could be omitted entirely.

Figure 3:
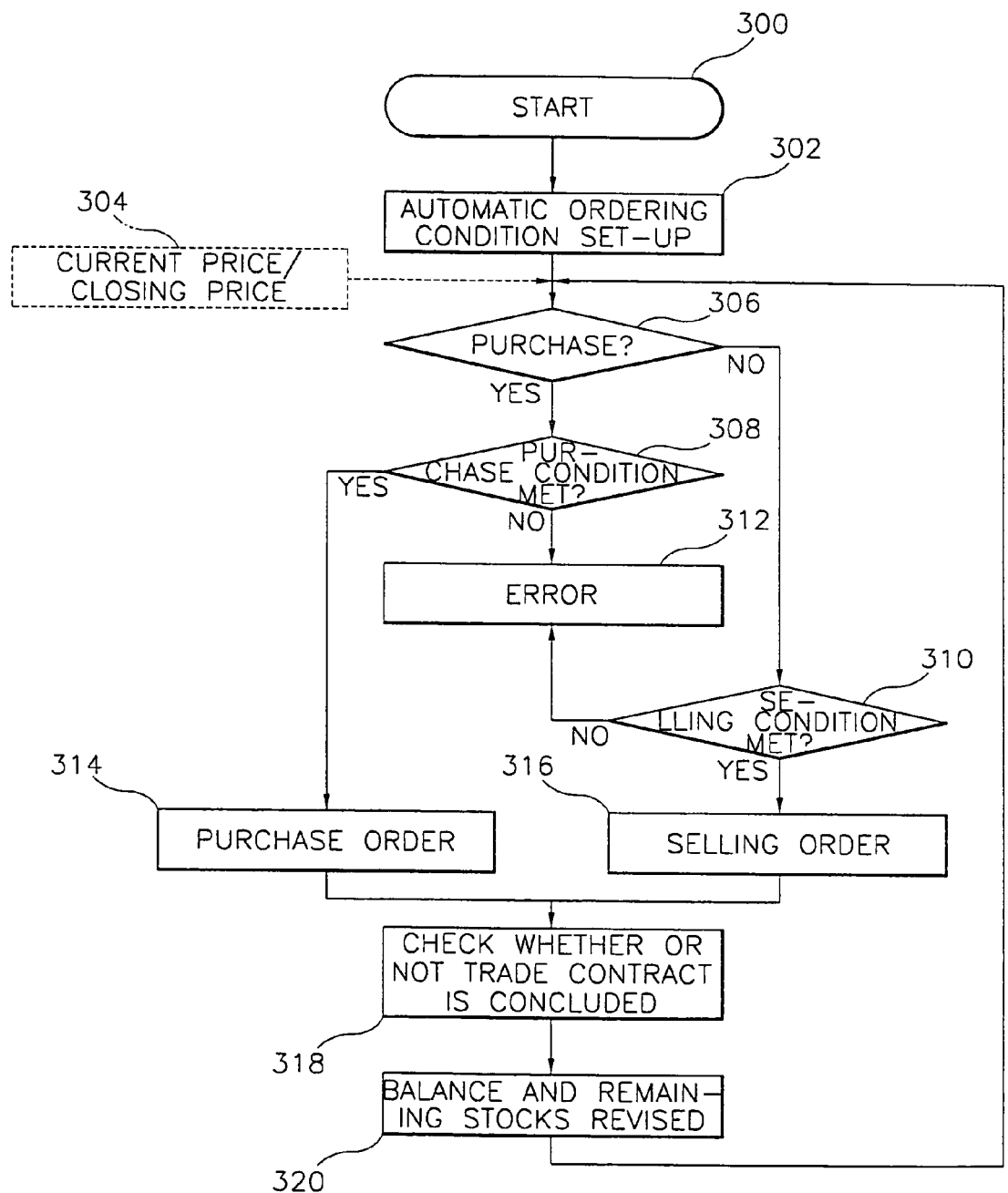
FIG. 3 is a flow chart illustrating a preferred method of automatically transacting stock deals using the automatic stock ordering system of FIG. 2 according to still further embodiments of the present invention.
Figure 4:
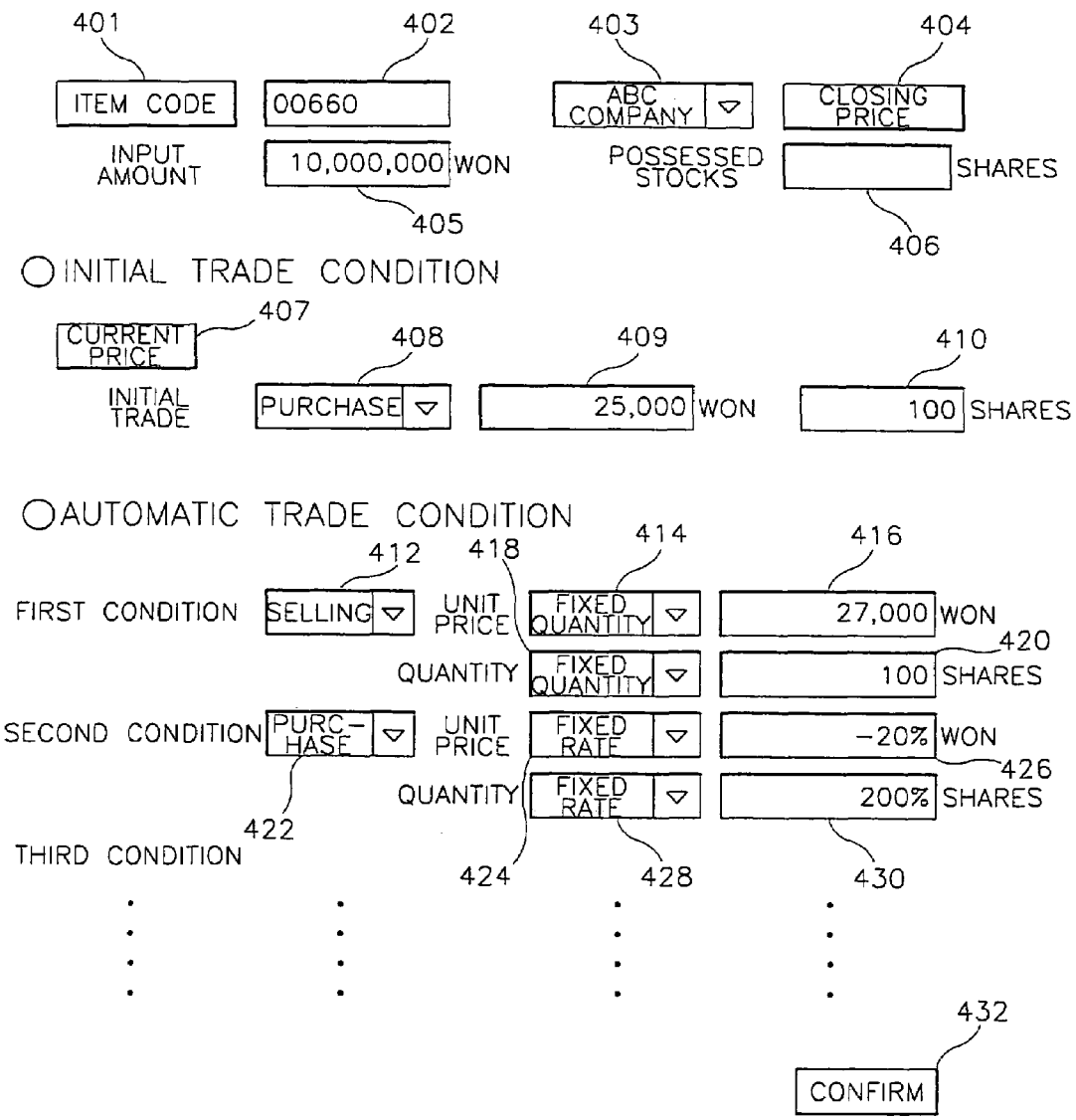
FIG. 4 is a schematic diagram illustrating a user interface providing user-selectable inputs for an automatic stock ordering system according to still further principles of the present invention.

FIG. 3 is a flow diagram illustrating a systematic, automated process for purchasing and selling trade objects according to another aspect of the present invention, which can be implemented using an automatic trading system such as that depicted in FIG. 2. FIG. 4 is a schematic block diagram illustrating one example of a user-interface permitting various inputs to be input by a user that can be used to control an automated trading process. An automatic trading method will now be described in further detail with reference to FIGS. 2, 3, and 4.

When an automatic ordering system is implemented and begins operation (step 300), basic information data is preferably gathered via the user interface 12 of the user computer 10 and then registered and stored in a memory device (not shown) of the computer 10. The basic information data can include a stock account number, a password (or secret, confidential number) for accessing the stock account, a name and residential registration number (such as a social security number or similar personal identifier) of a stockholder, an item code of possessed or desired shares, and the like. After the basic information data is gathered and registered during the initiation of the automatic ordering process, there is no need to reenter that information unless correction or updating of that information becomes necessary. A one-time registration of this basic information data at the start of the automatic ordering process is therefore sufficient and there is no need for additional registration during the process unless the basic information data needs to be amended.

Next, the stockholder sets up one or more automatic trading conditions for selling and/or purchasing a desired item of stock (during step 302). A user interface, such as that depicted in FIG. 4, can be provided to enable the user to expedite the establishment of the automatic trade condition(s). For example, an automatic selling condition may be established where a predetermined quantity of a held stock is sold whenever a price of that possessed stock rises by a predefined percentage or amount. Alternatively, or in addition, an automatic purchasing condition could be established wherein a predetermined quantity of the desired stock can be purchased whenever a price of the stock declines by a preset percentage or amount. In yet another option, an automatic trading condition may be defined wherein both purchase and selling conditions are established such that the desired stock is sold whenever a price thereof rises by a predetermined margin and purchased whenever it falls by a predetermined margin.

In the configuration of the user interface for setting an automatic trading condition depicted in FIG. 4, multiple fields are provided such that predictable conditions governing the automatic trading process can be specified by the user beforehand. Concurrently, however, the ability to modify fields is also preferably provided for circumstances where future conditions may arise that are difficult to foresee, such as change of management in a listed company and the like. When a field is left blank, the computer system 10 can interpret that field as one that is not to be utilized as a trading condition.

Referring specifically to FIG. 4, an item code selection button 401 can be provided to allow the user to search for or select a share to invest in. For instance, in order to select a stock of ABC company in field 403 as investment item, an item code 402 having the value "00660" corresponding to the ABC company may be selected or input. A reference button 404 that provides the closing share price from the previous day may also be provided. An amount of money to be used for automatic trading can be entered in an amount entry field 405. The entered amount need not necessarily correspond with the remaining monetary balance in the stock account. When the account holder possesses a number of stocks to be automatically traded, the number of stocks to be automatically traded can be entered in field 406. The number of stocks entered into the field 406 need not necessarily be the entire quantity of the stockholder's possessed stocks.

An initial trade condition can be established using additional fields in the user interface. Establishment of an initial trade condition is not the novel part of the present invention, however. Rather, the initial trade condition can be generally the same as the conventional methods and systems provided for cyber stock investors by current securities companies. A reference button 407 reflecting the current share price can also be provided. Item 408 is a button (or drop down menu) for selecting either a purchase or selling option for the initial trade. The trade amount and number of shares are preferably entered into fields 409 and 410, respectively. In the present example, an initial trade has been selected where 100 shares of ABC Company stock are to be purchased at 25,000 Korean Won per share.

The automatic trade condition(s) are set up to proceed based on the assumption that the initial trade will be contracted. To set up an automatic trade condition, fields 412 and 422 can be used to select whether the respective automatic trade will be a sale or purchase. Fields 414, 418, 424 and 428 can be used to select whether the unit price and trade quantity are to be determined based on a fixed quantity or fixed rate, and fields 416, 420, 426 and 430 can be used for entering the specific fixed quantity or fixed rate for the automatic transaction.

As explained above, the initial trade condition in this example is set up to purchase 100 shares of ABC Company stock at a price of 25,000 Won per share. Additionally, however, following the completion of the initial trade, a first automatic trade condition is established to transact a sale of 100 shares when the market price reaches the unit price of 27,000 Won per share. A second automatic trade condition, to be transacted following the contracting of the first automatic trade condition, is also established. The second automatic trade condition is set up as a purchase with a trade quantity increased by a fixed rate of 200% and a unit price lowered by a fixed rate of 20% compared to the quantity and rate of the first automatic trade. In other words, if the first automatic trade condition is contracted at the specified parameters, the second automatic trade condition will be set up to buy 200 shares of ABC Company stock at 21,600 Won per share.

In this manner, any number of automatic trade conditions can be established (for example, up to a fifth condition, a tenth condition, or more), using the same method. The automatic trade condition(s) can be confirmed by pressing a confirmation button 432. The user, however, preferably retains the ability to change, amend, remove, or cancel the automatic trade condition(s) at any time.

Referring back to FIGS. 2, 3, and 4, in a first embodiment, right after the initial trade is contracted, a purchase or a selling order is generated (such as by the user's computer 10) based on the predetermined first automatic trading condition, regardless of the current share price. Likewise, as soon as the trade order based on the first automatic trade condition is concluded, a trade order based on the second automatic trade condition is generated. In other words, as soon as the first a trade is concluded, a second trade order is automatically created regardless of current share price.

According to this method, a new stock trade order is automatically generated by the computer as many times as the previous automatic trade condition is satisfied. When all of the established automatic trade conditions are concluded, automatic trading is stopped. A user can be advised of the completion of the automatic trading via any appropriate notification method. This method may include, for instance, beeper, E-mail, cellular telephone, or the like. Notifying the user can be accomplished using well-know technologies.

When trading on the KSE, a determination should be made regarding whether the established trade price is within the daily upper limit and daily lower limit. When the stock trade order is placed within the limits, it should be permitted to proceed. If the order is placed outside of the limits, one or more errors can be generated during step 312. In certain circumstances (to be described more fully later), if only a partial quantity of the trade order is concluded, or if the trade is fulfilled at a price different from the trade order price, the account balance and stock residual quantity remaining may be different than those anticipated and thereby also cause an error to be generated.

If an error occurs, the automatic trading system is preferably stopped and the user can be notified of the error by an appropriate method, such as those described previously. When the user is notified of the error, the user may be permitted to change or amend the automatic trade conditions to reenable the automatic trade process to operate continuously without further user intervention. According to this embodiment, it is therefore possible for the user's computer system to automatically perform the trading of shares as desired without the user himself continuously monitoring changes of the stock market. In such circumstances, the user need only be notified and intervene in the trading process based on his or her specific requests or when errors are generated.

During step 304, in a second embodiment of the present invention, the computer system receives the closing price from the previous day as well as the present price of the concerned stock for comparison with the automatic trade condition. One disadvantage of the first embodiment is that, when a stock trade order is created regardless of the current price, or when the amount of invested money is too much, the user's investment strategy may be exposed to manipulation by other investors. In the second embodiment, therefore, when the preset condition is a fixed price, the stock purchase order or selling order is not generated until the present price at the stock market reaches the established price of the preset automatic trade condition. When the condition is a fixed rate, for instance, the second embodiment does not create a stock purchase order until the present price has dropped by the predetermined percentage (e.g., 5%) with respect to the previously contracted selling price, or a stock selling order until the current price is higher than the previously contracted purchase price by a predetermined percentage (e.g., 4%).

More particularly, in step 304, the system receives the current share price, which may be the closing price of the previous day. During step 306, a determination is made as to whether the automatic trade condition is a purchase condition or a selling condition. If the automatic trade condition is a purchase condition, the process proceeds to step 308 where the system determines if the purchase condition is met by comparing the current share price to the preset purchase price in the automatic trade condition. If the automatic trade condition is a selling condition, flow advances to step 310 to determine whether the selling condition has been met by comparing the current share price to the preset selling price in the automatic trade condition. In the case of a selling condition, the determination can include deciding whether the established selling quantity of the desired stock is possessed and whether (in the case of the KSE) a designated selling price is within an allowable trade range (i.e., within the range of the daily upper limit and the daily lower limit).

If the purchase or selling condition is met, a corresponding purchase order or selling order is automatically generated (for instance by the user's computer 10) during step 314 or 316, respectively, and the computer thereafter determines whether the generated purchase or selling order is contracted during step 318. The process can also include a step 312 for detecting and notifying the user of an error when the purchase or selling condition is not met at steps 308 and 310. If the purchase or selling order is not contracted on the same day, the same order can be repeated every day until the order is concluded. If the order is contracted, the account balance and residual share quantity can be updated during step 320. The process then continues with the computer comparing the current market conditions with the second automatic trade condition and so forth to determine whether or not the subsequent conditions have been met. When subsequent automatic trade conditions are met, new orders are immediately generated based on that preset trade condition.

With additional reference FIG. 2, the process, as implemented in the system of FIG. 2, will be further explained. Specifically, the market information can be received, during step 306, from a different computer system, such as via the Internet or the SEM computer system 30. This market information can include stock price, transacted quantity and the like. Although the user computer 10 may receive market information directly from the SEM computer system 30, it is also possible for the computer system 20 at the brokerage company to receive the market information and relay that information to the user computer 10. The received market information is then compared with the automatic trading condition information previously established by the user (step 302) using the trade condition control module 16 and a determination is then made as to whether the market information satisfies the purchase condition (step 308) or the selling condition (step 310).

For example, if the selling condition is a 4% increase in stock price, and the market information data reflects a stock price of 4% or more above the previously contracted price, then it is determined that the selling condition is met. If the purchase condition is a 3% decrease in price, then if the price of the desired stock has declined by 3% or more, the purchase condition is satisfied. It should be noted that trading conditions for numerous various stocks may be established and under such circumstances, the stock prices for each of the desired stocks can be simultaneously or systematically received and many buying or selling conditions can be met at the same time.

When the trade condition control module 16 determines that one of the automatic trading conditions has been satisfied, a purchase order or a sale order (as appropriate) is generated by the trade order control module 14 and communicated to the trade order performing module 24 of the computer system 20 and thereafter to the SEM (during step 312). Using the automatic order system and method, the determinations (steps 308 and 310) can be performed numerous times per day as market information is received in real time, and numerous trading orders (step 312) can therefore be generated and concluded during a single day. There may also be days, however, where market conditions do not satisfy any of the pre-established purchase or selling conditions even once during the day, in which case the stock market will close without any of the automatic trading orders having been placed.

When the trade order control module 14 places a trading order, a determination can be made using the account control module 24 as to whether the account balance and residual stock quantity are out of limit. If the deal cannot be concluded within the available limits, the module 24 can notify the stockholder and ask whether the order should be cancelled or revised. It may be desirable, however, for an out-of-limit order to trigger an automatic revision of the trade conditions, such as to trigger the purchase or sale of a reduced quantity of the desired stock when the trade does not fall within the limits, because anticipation of this condition is not particularly difficult. Therefore, when the account control module 26 determines that an order is made where the account balance or residual quantity of stock is insufficient to complete the order, a dealing condition stored by the trade condition control module 16 can be modified, such as by the dealing order control module 14 requesting a revised trading order from a user or automatically revising the trade order to fall within the available limits. A final trading order is then requested and the final trading order is transmitted to the SEM computer system 30 by the trade order performing module 24.

The trade order conclusion control module 34 at the SEM computer system 30 receives the final order and compares it with trade orders from other brokerage companies. When an appropriate trade order match is identified, the trade order conclusion control module 34 allows the order to be concluded and confirms the trade conclusion to the trade order performing module 24. The trade order performing module 24 then transmits the concluded price and quantity to the account control module 26 and trade condition control module 16. In response to the notification, the account control module 26 modifies the account information relating to the residual account balance and quantity of the desired stock. The trade condition control module 16 also preferably separately stores the concluded dealing conditions and revises the dealing conditions for subsequent trade orders according to the automatic trade conditions set up initially or according to a user's modified instructions.

When a trade order dealing is not concluded due to the non-existence of a matching order having a corresponding price and quantity, the trade order conclusion control module 34 preferably notifies the trade order performing module 24 of the fact that no trade has been concluded. The trade order performing module 24 can, in turn, provide that information to the trade order control module 14. Under such circumstances, as market information is received from the stock control module 36, if it is possible to request the same order again, the order repeated. Otherwise, the order is held pending instructions from the user whether to revise or discard the order.

The process continues in step 320 by gathering, storing, and/or modifying account information such as the stock account balance, residual stock quantity and the like using the account control module 26 of the SEM computer system 20. This stage of step 320 may be omitted, however, because it's main purpose is to allow a user to be apprised of the account information, which is not essential to the automated process.

The second embodiment can also include fields within the automatic trade condition area for establishing a limit on the period of time permitted for generating the trade order. During steps 308 and 310, in addition to comparing the current price with the price of the automatic trade condition, the trade order generation time condition should also be evaluated. Under these circumstances, if the time limit is not yet met, steps 308 and 310 should be allowed to proceed continuously, without creating an error 312, until the time limit has expired. A time condition comparison means (not shown) for providing this feature may be provided using devices well-known within the art and can be integrated, for instance, into the trade order control module 14 and/or the trade condition control module 16.

Although the above description has been provided on the assumption that useable residual money and stock quantities are available in the stock account for performing the automatic trades, it should be understood that the automatic ordering method and system according to the present invention can be applied even if the useable remainder or the residual stock quantity are insufficient. For instance, where a predetermined amount of money is deposited as a useable balance after a stock account is opened, an initial stock purchase can occur for a particular stock at a particular amount or in a particular quantity. These initial stock purchase conditions can be set up via the user's interface 12 at the user's computer 10 using the trade condition control module 16. After the occurrence of the initial stock purchase, if the useable remainder or residual stock quantity are insufficient to continue automatic trading, the dealing conditions may be revised through the user's interface 12 or automatically to allow the automatic ordering operation to be performed on different conditions.

According to another example of a stock trading condition, information such as the increase and decrease of composite price index, stock trading quantity and the like can be utilized as market information. Similarly, data appearing on financial statements of a listed company whose stocks are possessed by the user, or items about personnel changes at the listed company may be utilized as market information data that can be used to generate stock trading conditions. In one specific example, a memory device can store a personnel database wherein respective personnel management ability is indexed. Conditions may be established, for instance, wherein if a person with a high management capability rating is promoted, a predetermined quantity of stocks corresponding to that manager's company are purchased.

In another example, performance data or data relating to performance indicators may be monitored, such as a net income increase rate of a selected company. A condition may be established such that when information is received indicating that this performance indicator has risen above a predetermined numerical value, it triggers the purchase of a predetermined quantity of shares in that company. These kinds of market information data may be obtained from the SEM computer system 30. It should also be noted, however, that these types of information could also be received from a computer system (not shown) of the desired company (or other companies or information providers) via the Internet.

Another embodiment of the present invention will now be described with reference to FIGS. 5, 6, and 7. The previously-described embodiments have been described primarily in terms of either a purchase order or a selling order being automatically created according to an established automatic trade condition. According to the embodiment depicted in FIGS. 5, 6, and 7, however, both a purchase order and a selling order can be simultaneously generated based on the established automatic trade conditions.

Figure 5:
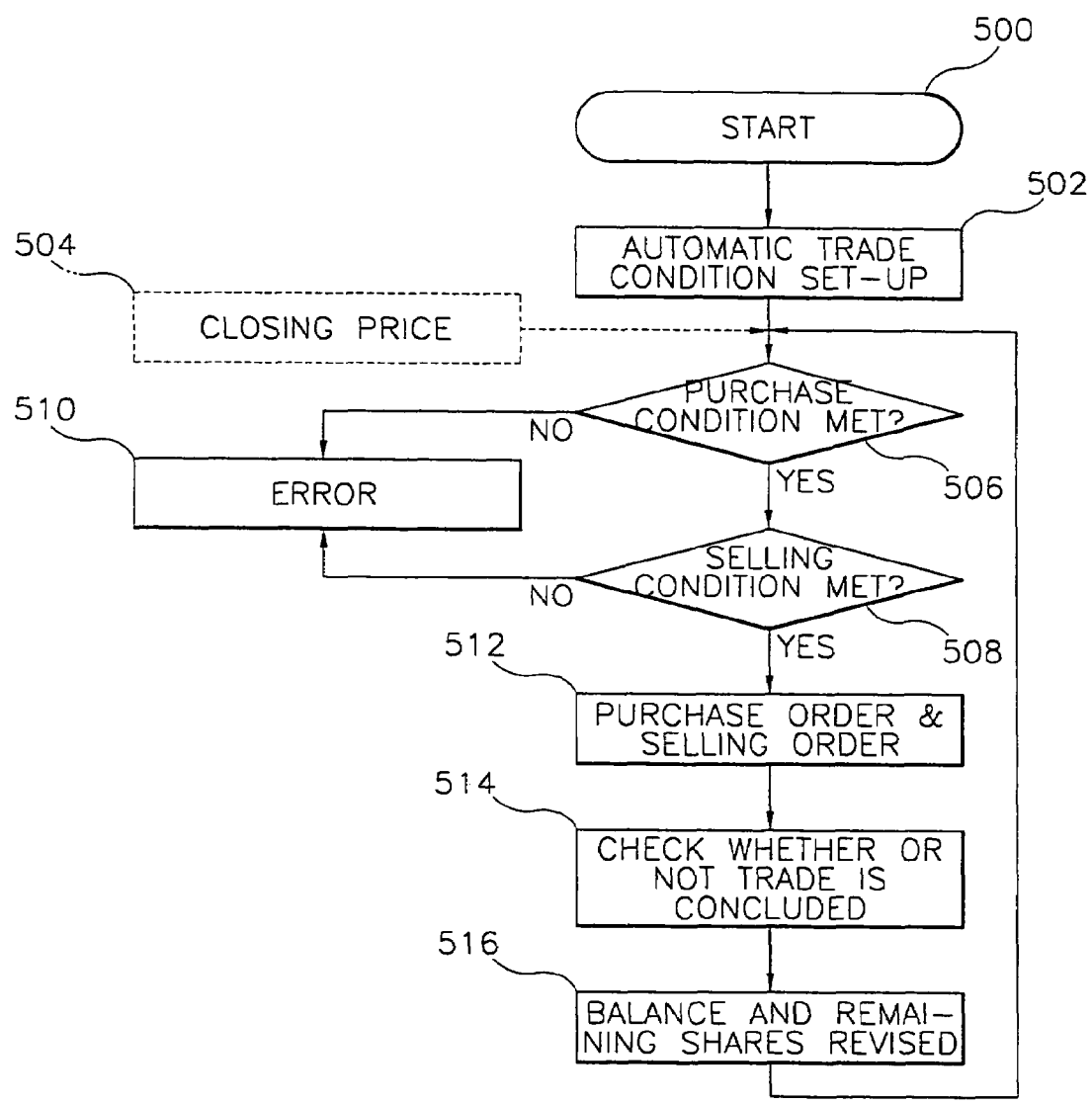
FIG. 5 is a flow chart illustrating a method of operation for an automatic stock ordering system according to additional embodiments of the present invention.

Referring specifically to FIG. 5, an automatic trading system according to this embodiment is activated during step 500, and automatic trade conditions are then set up during step 502. The automatic trade conditions may be established using a user interface such as that exemplified in FIG. 6. Other than the automatic trade condition set-up unit, the purposes of the unnumbered fields shown in FIG. 6 are similar to those indicated by reference numerals 401 through 410 in FIG. 4. In the present example, however, the stockholder is shown possessing 10,000 shares of DEF Company stock and the initial trade condition is set up to sell 100 shares of DEF company at 10,000 Won per share.

Referring to FIG. 6, to set up the automatic trade condition of this embodiment, a reference quantity is input into field 602 to establish a standard selling and purchase quantity for each of the automatic trades. Fee rates (and taxes) of the securities company that are to be paid with each trade can be entered into field 604. While not essential, this input is helpful when calculating profits after stock trading. The purchase and selling prices for automatic trading can be input into fields 606, 608, 614 and 616. The purchase price, for instance, may be established by setting a predetermined price or a predetermined rate below the previous selling price to be used for subsequent trading conditions.

In this example, an automatic purchase price of 500 Won lower than the selling price is established for each subsequent automatic purchase order. An automatic purchase quantity may also be established at a fixed rate or at a fixed quantity in field 610. If field 612 is left blank, the automatic purchase order quantity for every trade is the reference quantity established by field 602, which, in this example, is 100 shares. Plus (+) and minus (−) symbols may be used in field 612. Where a plus (+) symbol is used, the automatic purchase order quantity is increased by a fixed rate or a fixed quantity. Conversely, where a minus (−) symbol is used, the automatic purchase order quantity is decreased by a fixed rate or by a fixed quantity.

An automatic selling condition can also be set up using fields 614, 616, 618 and 620 in a manner similar to that described above. As with the purchase quantity, an automatic selling quantity may be established at a fixed quantity or a fixed rate in fields 618 and 620. If field 620 is left blank, as in the present example, the selling quantity for the automatic selling condition is the reference quantity found in field 602. In this case, the automatic selling condition is set up to automatically sell 100 shares at a price increased by 1,000 Won over the previous trading price. An extra trade condition may also be established at a fixed rate or at a fixed quantity using fields 622 and 624. The extra trade condition will be further described later.

The user may further establish a target profit or earning rate in field 626. If a target profit rate is not set up, the automatic trading preferably continues until stopped by the user. Using an automated trading system according to the principles of this invention, however, it is easy for the computer to calculate an earning rate at every step of the automatic trading process, and it is therefore desirable to have a predetermined profit rate established and to automatically stop the automatic trading process when the target profit rate has been achieved.

The user may use a trade table application button 628 to cause the computer to draw up (or create) an automatic trade table, such as the one shown in FIG. 7. It should be readily apparent, however, the automatic trade table can be virtual, and that the creation of a table viewable by a user is entirely optional. In other words, a system constructed according to the principles of the present invention can perform the automatic trading process just by storing a formula or logic for determining the information or data that would be stored in the automatic trade table 700, and does not necessarily need to create an actual table.

Referring to FIG. 7, the automatic trade table 700 in this example is constructed using the information from the automatic trade condition(s) established in FIG. 6. More particularly, the automatic trade table 700 is constructed such that each subsequent selling price in selling column 714 is 1,000 Won less than the previous selling price, while each subsequent purchase price in purchase column 712 is 1,000 Won less than the previous purchase price and 500 Won less than a corresponding selling price in the same row (see, e.g., rows 702 through 710). In the automatic trade table 700, prices can further be adjusted up and down on the basis of the initial trade price. In this particular embodiment, the trade table 700 can be viewed by a user and confirmed using a trade table confirmation button 716.

If, unlike the example in FIG. 6, an automatic trade condition is determined at a fixed percentage rate, the purchase price or selling price in the trade table or the trade order quantity may be calculated in decimal points. The KSE, for example, however, has stipulated that shares should be traded on a 50 Won unit base for share prices ranging between 10,000 Won to 50,000 Won, to thereby limit units of trade price and quantity. If this requirement cannot be observed using the fixed percentage rate calculation, the share price for the automatic trade table 700 can be changed to an approximate one or rounded to a value that satisfies the trade requirements. In most such cases, the trade table is preferably adjusted to an approximate price to cater to the trade regulations of the particular country where trading is being performed. This price adjustment can be automatically performed by computer, and each column in the trade table can be amended in order quantity, selling price, or purchase price as desired. In FIG. 7, the table is in satisfactory units and therefore has not been amended or changed.

Referring to FIGS. 5 and 7, as soon as the initial trade order is successfully concluded, a first automatic purchase order and a first automatic selling order are both created using the automatic trade information data contained in the automatic trade table 700. The table 700, as explained above, is generated using the automatic trade conditions established during setup in step 502. This embodiment is designed to systematically and repeatedly buy a desired stock at a lower price and sell it at a higher price. Accordingly, when an initial selling order is concluded, a purchase order is automatically placed at a price just below the contracted initial selling price and a selling order is automatically placed at a price just higher than the contracted selling price.

In this specific example, for instance, when the selling price is 10,000 Won, a purchase order of 100 shares at a purchase price of 9,500 Won is placed (see purchase column 712 at line 706) and a selling order for 100 shares at a selling price of 11,000 Won is also placed (see selling column 714 at line 704). As long as the selling and purchase orders are within the account balance and possessed number of shares, no errors are generated during steps 506 and 508.

When a purchase order is contracted as ordered based on the first automatic trade condition, a subsequent automatic purchase order and selling order, based on the automatic trade conditions found adjacent to the contracted order price in the automatic trade table 700 can be generated. As previously mentioned, this embodiment is designed to buy at a lower price than the immediately preceding contracted price and to sell at a higher price than the immediately preceding contracted price. More particularly, a second automatic trade order is created following the steps outlined in FIG. 5 (e.g., steps 514, 516, 506 and 508) and the process is repeated. In the above example, if the first automatic purchase order of 100 shares at 9,500 Won (see line 706) is successfully contracted, the automatic trade conditions in the automatic trade table 700 will be used to establish a new purchase order of 100 shares purchased at 8,500 Won (see line 708) and a new selling order of 100 shares at 10,000 Won (see line 706).

This process can then continue repeatedly with a third automatic order and so forth. For instance, when a selling order is concluded based on the second automatic trade order at the preset automatic selling price of 10,000 Won, a third automatic purchase order is initiated for 100 shares at 9,500 Won (see line 706), which is close to the previously contracted selling order price. A third automatic selling order is also generated for 100 shares at 11,000 Won (see line 704). In other words, each subsequent automatic trade order preferably generates a purchase order at a price below the previously contracted price by a predetermined margin, and a selling order above the previously contracted price by a predetermined margin, where the predetermined margins are established by the automatic trade information data contained in the automatic trade table 700.

By performing automatic trades using this embodiment, a profit can be created in cases where the share price fluctuates within a price range around the initial trade price. Referring to FIG. 7, by way of example, when a share price rises from 10,000 Won to 14,000 Won and then drops to 10,000 Won, a predetermined amount of earnings can be generated. Furthermore, even in cases where there are more extreme fluctuations, such as a share price drop from 10,000 Won to 4,000 Won and a later rise back to 10,000 Won, profit can be gained. As is apparent from this description, this third embodiment may therefore be an appropriate investment method for stocks where a share price frequently vertically fluctuates within a certain price range.

Referring again to FIG. 6, the extra trade condition that can be set up using fields 622 and 624 can be established to increase a selling quantity and a purchase quantity where an automatic trade is generated more than once at the same price during the automatic trading. In other words, in cases where a purchase order and a selling order are generated twice or more at the same price due to fluctuations of the share price, the extra trade condition can permit further pre-specified trading under those conditions.

Referring back to FIG. 5, a discrimination is made as to whether a purchase condition and a selling condition are met by comparing the established automatic trade conditions with the balance of securities account and the quantity of possessed stocks in steps 506 and 508. In order to buy stocks, enough money should remain in the account to at least equal the established purchase quantity multiplied by the established purchase price. In order to sell stocks, the possessed quantity of stocks should at least equal the desired selling quantity. In cases where purchases are continuously contracted by the automatic trading process without offsetting sales, the monetary balance in the securities account may become drained. Likewise, in cases where selling deals are continuously performed without offsetting purchases, the quantity of possessed stocks may be depleted.

When the tests performed by steps 506 and 508 are met (meaning that the balance of money or stocks in the account are sufficient to contract the automatic trade order), the automatic trade purchase order and selling order are simultaneously generated during step 512. When one or more of the tests performed by steps 506 and 508 are not satisfied (meaning that there is either insufficient funds or possessed stock to complete an order), an error occurs, and the occurrence of error is reported to the stock investor by an appropriate notification method during step 510. The occurrence of an error may, for example, cause an error message to be displayed on the user interface, or it may cause an alarm sound to be generated, or both. Alternatively, or in addition, the system may be configured to notify the stock investor of the error by way of a wired transmission, a wireless call or pager notification, an email or text message, or other type of notification when an error happens. These error notifying methods are, of course, well known in the art, and any other method of error notification could also be used.

As indicated, where the tests performed in steps 506 and 508 are satisfied, a stock purchase order and a stock selling order are created during step 512. It should be noted that, in this embodiment, both the purchase order and the selling order are generated at the same time. This embodiment is therefore quite different in this regard from conventional stock investment methods. In fact, when placing the automatic trade orders according to this embodiment, the current share price can be disregarded and the price change of stocks does not need to be anticipated at all. That is because, by setting up both purchase and sell orders, a certain quantity of stock is purchased when a share price drops relative to a price of previously purchased shares, while if the share price rises compared with the previously purchased share price, a certain quantity of stock is sold. This process can therefore proceed based on relative increases or decreases in the share price, regardless of the initial share price and without depending on what the actual price of the share is.

In step 514, a determination is made as to whether or not a trade has been contracted (concluded). The contracted trade order may be either a selling order or a purchase order. If neither order has been contracted by the time the stock market closes, the same purchase order and the same selling order can be generated the next day. In exceptional circumstances, a partial contract (e.g., a contract with a price different from an order price, a quantity different than the order quantity, or the like) may occur. If only a partial contract has been concluded, the system may treat the whole order as having been contracted, or a selling order and/or a purchase order sufficient to complete the original order may be generated. For instance, if a contract is made for a different quantity of stocks, an order for the remaining quantity of stocks that were not contracted may be generated at the same price as the previous order. If a contract is made at a price different from the order price, a purchase order just below the contracted price and a selling order just above the contracted price can be created.

Whenever an order is concluded, the account balance and stock remainders are revised during step 516. And if, during steps 506 and 508, one of the preset automatic trade conditions is met, a new purchase order and a new selling order are immediately generated again using the preset automatic trade conditions.

In one example, a closing price is received from the stock brokerage company computer system 20 or the SEM computer system 30 during step 504 for use in determining whether the purchase condition or the selling condition have been met. In cases where ex-dividend or the like occurs, for example, the reference price may be different from the closing price of the previous day. In addition, many other exceptional circumstances can occur in the stock market, such as reduction of capital, stock splits, consolidation in par value, and the like. In these circumstances, the system preferably automatically stops the automatic trading process and notifies the user.

Another embodiment of the present invention is a variation of the previously-described embodiment and is characterized by its simultaneous generation of two or more purchase orders and two or more selling orders. In the event that a large volume of purchase orders or selling orders occur in the stock market, trade orders in various price ranges can be concurrently concluded in such a manner as to rapidly and broadly change the stock prices.

In one example, three selling orders and three purchase orders can be set up to be simultaneously generated. The three selling orders can each be set above an initial contract price of 10,000 Won, (i.e., one sell order for 100 shares at 11,000 Won per share, another sell order for 100 shares at 12,000 Won per share, and a third sell order for 100 shares at 13,000 Won per share). The three purchase orders can each be set below the 10,000 Won initial contract price (i.e., one purchase order for 100 shares at 9,500 Won per share, a second purchase order for 100 shares at 8,500 Won per share, and a third purchase order for 100 shares at 7,500 Won per share). The automatic trade conditions for concurrently generating these automatic trade orders can come from the automatic trade table 700, as shown in FIG. 7.

If any one of these six orders is contracted, the remaining five orders are immediately cancelled the moment the contracted order is concluded. Following the contracting of the first order, subsequent automatic trade orders may include only one purchase order and one selling order based on the contract price, similar to the earlier-described embodiment. This fourth embodiment is particularly useful for reserving orders before the stock market is open and after the stock market is closed. This embodiment may additionally provide a column for limiting the number of plural orders generated in the automatic trade condition of FIG. 6.

Each of the embodiments described previously as implementing principles according to the present invention can be implemented using a system similar to that illustrated in FIGS. 1 and 2. For instance, information received from the computer system 30 of the SEM or other computer (not shown) connected to the Internet can be compared with the automatic trade condition previously set up by a user using the trade condition control module 16. The trade condition control module can thereby determine whether or not a purchase condition and/or a selling condition has been satisfied. Using this determination, if one or more of the condition(s) is(are) met, a subsequent selling order and/or purchase order can be placed by the trade performing module 24 of the computer system 20 at the securities company using the trade conditions established using the trade order control module 14.

Significantly, the principles of the present invention permit the computer system to receive market information in real time and to repeatedly and automatically determine whether the market conditions satisfy the preset conditions in order to systematically generate automatic trade orders from the activation of the automatic ordering process until it is stopped. Using this system, automatic trade orders can be placed several times in a single day.

Once the trade order is placed using the trade order control module 14, the account control module 26 determines whether the account balance and remaining stocks are within the available limits, and once placed, the trade order is transmitted to the computer system 30 of SEM using the trade performing module 24. The trade conclusion control module 34 at the computer system of the SEM receives the order and compares the order with trade orders of other securities companies. If an appropriate price match is found, then the trade is accomplished and the trade performing module 24 is notified of the trade contract. The trade performing module 24 notifies the account control module 26 and the trade condition control module 14 of the contracted price and quantity, and the account control module 26 then rectifies the remaining balance and quantity information. The trade condition control module 14 further separately stores the actually contracted trade condition and then amends the trade condition to correspond to the predetermined automatic trade conditions established during the set-up state or based on subsequent user instruction.

As is readily apparent from the foregoing description, the automatic ordering system and process for trading stocks according to the principles of the present invention provide significant advantages over conventional system and methods. Among other things, using the inventive computer-implemented software system described herein, an investor can reduce or eliminate the loss of time conventionally consumed by monitoring the stock market conditions and further consumed by repeatedly inputting orders. A securities company can likewise decrease the amount of time and cost required for inputting and managing trade orders. Still another advantage is that the likelihood of erroneously inputting data necessary for stock trade orders can be substantially eliminated, thereby preventing investment loss resulted from erroneous inputs.

Although the present invention has been described with reference to various specific embodiments, the invention is not limited to the embodiments disclosed, which are considered to be purely exemplary. And although the above embodiments have been described terms of using a desired purchase price, selling price, and trade quantity as the automatic trade conditions for stocks, other conditions such as an increase/decrease of composite share index, an increase/decrease of stock trade volume, a technical index, or other variables may be used to establish an automatic trade condition. Furthermore, although the present invention has been described primarily in terms of stocks, other trade objects such as bonds, futures, options, foreign current exchanges, grains, minerals, index swaps and the like, which are traded in a manner similar to stocks, may also benefit from the principles of the present invention. The invention is also not limited to the particular SEMs or currencies described herein. Accordingly, the invention is only limited by the spirit and scope of the claims.

What is claimed is:

1. A computer readable medium comprising instructions that, when executed, cause a computer system connected to a data communication network to:
   (a) permit a user to select a trade-desired object and input an initial trade condition for selling or purchasing the selected object in the computer system, the initial trade condition including a price for selling or purchasing and a trade-desired quantity;
   (b) receive a user-inputted automatic trade condition for determining purchase and selling conditions, the automatic trade condition comprising information for deciding a selling price, a selling quantity, a purchase price and a purchase quantity for subsequent orders:
   (c) permit the user to place an initial trade order according to the initial trade condition through the data communication network:
   (d) immediately after the initial trade order has been contracted and without further intervention by the user, generate and place an automatic purchase order and an automatic selling order for trade according to the automatic trade condition:
   (e) immediately after one of the automatic selling order and the automatic purchase order is contracted, without further intervention by the user generate and place a subsequent automatic purchase order and a subsequent automatic selling order for trade according to the automatic trade condition by the computer system: and
   (f) repeat the process (e): wherein the selling order in each of the processes (d) and (e) is higher than the previously contracted price in each of the processes (d) and (e), and the purchase order price in each of the processes (d) and (e) is lower than the previously contracted price in each of the processes (d) and (e).

2. A computer readable medium according to claim 1, wherein the computer system comprises a user computer system and a brokerage computer system.

3. A computer readable medium according to claim 1, wherein the automatic trade condition generates selling and purchase order prices increased or decreased by a fixed amount from the previously generated orders.

4. A computer readable medium according to claim 1, wherein the automatic trade condition generates selling and purchase order prices increased or decreased by a fixed rate from the previously generated orders.

5. A computer readable medium according to claim 1, wherein the automatic ordering condition is used to create an automatic trade table, where an automatic trade order is generated from the automatic trade table.

6. A computer readable medium according to claim 1, wherein the automatic trade condition includes a target profit rate and wherein the process (t) further comprises: calculating a profit rate from the completed contracts before repeating the process (e): comparing the calculated profit with the target profit rate: and stopping the automatic trading if the target profit is obtained.

7. An automated system for ordering stocks, the system including a user computer system connected to a computer system at a stock exchange through a data communication network, the automated system comprising:
   a user interface at the user computer system for receiving riser input:
   a memory device for storing basic information data including an item code of a desired stock and an account number era stock holder and for storing an automatic trade condition, wherein the basic information data and the automatic trade condition are input into the computer system through the user interface;

a trade condition control module for using the automatic trade condition to determine multiple selling order conditions including selling price and quantity and purchase order conditions including purchase price and quantity for automatically conducting trades of the desired stock: and a trade order control module for placing a stock trade order corresponding to the selling order condition or the purchase order condition, for determining whether the stock trade order has been met, for generating a subsequent stock trade order using the automatic trade condition at a new price, and for automatically placing the subsequent stock trade order through the data communication network if the condition is met, wherein through the data communication network, the trade order control module repeatedly places new stock trade orders using the selling order conditions and purchase order conditions determined by the trade condition control module immediately after a previous stock trade order has been contracted at a contracted price, wherein a new selling order price is higher than the contracted price, and wherein a new purchase order price is lower than the contracted price.

* * * * *